United States Patent
Burl et al.

(10) Patent No.: US 7,162,056 B2
(45) Date of Patent: Jan. 9, 2007

(54) SYSTEMS AND METHODS FOR THE AUTOMATED SENSING OF MOTION IN A MOBILE ROBOT USING VISUAL DATA

(75) Inventors: Michael Christopher Burl, Superior, CO (US); Paolo Pirjanian, Glendale, CA (US)

(73) Assignee: Evolution Robotics, Inc., Pasadena, CA (US)

( * ) Notice: Subject to any disclaimer, the term of this patent is extended or adjusted under 35 U.S.C. 154(b) by 0 days.

(21) Appl. No.: 10/642,358

(22) Filed: Aug. 15, 2003

(65) Prior Publication Data

US 2004/0076324 A1 Apr. 22, 2004

Related U.S. Application Data

(60) Provisional application No. 60/404,348, filed on Aug. 16, 2002.

(51) Int. Cl.
G06K 9/00 (2006.01)
B25J 5/00 (2006.01)
B64C 13/18 (2006.01)
G05B 15/00 (2006.01)
G01C 22/00 (2006.01)
H04N 7/00 (2006.01)

(52) U.S. Cl. ............... 382/104; 382/153; 318/568.12; 318/587; 700/259; 701/28; 348/119

(58) Field of Classification Search ............ 382/153, 382/104, 236; 180/167; 318/587, 568.12; 348/113, 118, 119, 155; 700/259; 701/23–28; 901/1; 446/7, 230
See application file for complete search history.

(56) References Cited

U.S. PATENT DOCUMENTS 4,628,453 A * 12/1986 Kamejima et al. ............ 701/28
4,969,036 A * 11/1990 Bhanu et al. ............ 348/113
5,001,635 A     3/1991 Yasutomi et al. ........... 701/26
5,081,585 A     1/1992 Kurami et al. ............ 701/28
5,109,425 A *   4/1992 Lawton ..................... 382/107

(Continued)

OTHER PUBLICATIONS

Wang et al. "A Structure-from-motion Algorithm for Robot Vechicles Guidance". Proceedings of the Intelligent Vechicle '92 Symposium. Jun. 29-Jul. 1, 1992, p. 30-35.*

(Continued)

*Primary Examiner*—Vikkram Bali
*Assistant Examiner*—Colin LaRose
(74) *Attorney, Agent, or Firm*—Andrew Naglestad; Knobbe Martens Olson & Bear LLP

(57) ABSTRACT

The invention is related to methods and apparatus that detect motion by monitoring images from a video camera mounted on a mobile robot, such as an autonomously navigated mobile robot. Examples of such robots include automated vacuum floor sweepers. Advantageously, embodiments of the invention can automatically sense a robot's motional state in a relatively reliable and cost-efficient manner. Many configurations of robots are configured to include at least one video camera. Embodiments of the invention permit the use of a video camera onboard a robot to determine a motional state for the robot. This can advantageously permit the motional state of a robot to be determined at a fraction of the cost of additional sensors, such as a laser, an infrared, an ultrasonic, or a contact sensor.

43 Claims, 11 Drawing Sheets

U.S. PATENT DOCUMENTS

| | | | |
|---|---|---|---|
| 5,387,947 A | 2/1995 | Shin | 348/699 |
| 5,652,489 A | 7/1997 | Kawakami | |
| 5,706,355 A | 1/1998 | Raboisson et al. | 382/104 |
| 5,838,828 A * | 11/1998 | Mizuki et al. | 382/236 |
| 5,995,884 A | 11/1999 | Allen et al. | 701/24 |
| 6,321,147 B1 | 11/2001 | Takeda et al. | 701/23 |
| 6,362,589 B1 | 3/2002 | Inoue et al. | 318/568.2 |
| 6,408,109 B1 | 6/2002 | Silver et al. | 382/300 |
| 6,462,498 B1 * | 10/2002 | Filo | 318/568.12 |
| 6,496,592 B1 | 12/2002 | Lanini | 382/103 |
| 6,809,490 B1 | 10/2004 | Jones et al. | 318/568.12 |
| 2003/0007682 A1 * | 1/2003 | Koshizen et al. | 382/157 |
| 2004/0017937 A1 * | 1/2004 | Silverstein | 382/153 |

OTHER PUBLICATIONS

Wang et al. "A structure-from-motion algorithm for robot vehicle guidance." Intelligent Vehicles '92 Symposium., Proceedings o the Jun. 29-Jul. 1, 1992, pp. 30-35.

Davison et al. "Simultaneous localization and map-building using active vision." Pattern Analysis and Machine Intelligence, IEE Transactions on, vol. 24, Issue: 7, Jul. 2002, pp. 865-880.

Horn, B.K.P. *Robot Vision.* MIT Press, 1986. pp. 162-170, 278-294, 400-417. ISBN 0-262-08159-8.

PCT International Search Report with mailing date of May 19, 2004 from corresponding PCT/US03/25666.

* cited by examiner

Image 1

(Normal)

gradient magnitude (Negative)

(Negative)

Image 2

(Normal)

gradient magnitude (Negative)

gradient threshold (Negative)

sloppy x-or (Negative)

Image 3

(Normal)

gradient magnitude (Negative)

gradient threshold (Negative)

gradient threshold (Negative)

SYSTEMS AND METHODS FOR THE AUTOMATED SENSING OF MOTION IN A MOBILE ROBOT USING VISUAL DATA

RELATED APPLICATION

This application claims the benefit under 35 U.S.C. § 119(e) of U.S. Provisional Application No. 60/404,348, filed Aug. 16, 2002, the entirety of which is hereby incorporated by reference.

BACKGROUND OF THE INVENTION

1. Field of the Invention

The invention generally relates to mobile robots. In particular, the invention relates to a relatively economical and efficient technique to permit a mobile robot to detect a motional state.

2. Description of the Related Art

Mobile robots are becoming more and more commonplace in society. It will be understood that these robots can be embodied in various forms, such as in automated vacuum cleaners. A variety of applications can be found for mobile robots, such as, but not limited to, entertainment applications, such as toy robots, utility applications in environments that are unfriendly to humans, such as space, deep water, cold temperature, radiation, chemical exposure, biohazards, etc., dangerous tasks such as defusing of potential explosives, operation in confined spaces, such as collapsed buildings, the performance of menial tasks, such as cleaning, etc.

In many of these applications, relatively autonomous behavior from the mobile robot is desirable without an excessive amount of human interaction. One ability that significantly enhances the ability for a mobile robot to operate autonomously is the ability to move safely.

Conventional techniques for obstacle avoidance include the use of proximity sensors. For example, the TRILOBITE®, a mobile robot embodied as an automated vacuum cleaner available from Electrolux AB of Sweden, uses sonar sensors to detect obstacles in the vicinity of the robot. As another example, the RoboScout Personal Robot, available from Sharper Image Corporation, employs infrared sensors for a similar purpose. Even more sophisticated obstacle detection systems can be found in industrial applications. For example, the Pioneer series of robots from ActivMedia Robotics, LLC, uses a laser range finder to detect nearby obstacles. Disadvantageously however, proximity sensors often do not reliably detect obstacles and can be relatively expensive. For examples, proximity sensors can suffer from blind spots and can often fail to reliably detect obstructions. For example, a laser range finder typically performs proximity detection in a single plane such that an obstacle of non-uniform shape, such as an obstacle with a bump or an overhang, may not be reliably detected as an obstacle by the laser range finder.

Other mechanisms can also permit a mobile robot to move about safely. For example, the Roomba™, which is a mobile robot embodied as an automated vacuum cleaner available from iRobot Corporation, uses a contact sensor to detect a collision between the robot and an obstacle. Contact sensors are also known in the art as "bump sensors." In response to the detection of the collision, the robot can subsequently adjust the robot's path. Disadvantageously however, contact sensors may not reliably detect collisions between the robot and an obstacle. For example, a bump sensor typically provides coverage for only a relatively small portion of the robot's surface area; thus, an obstacle that contacts the robot outside the coverage area is often undetected by the bump sensor.

In addition, other navigational hazards, such as unnavigable floor surfaces, are typically not detected by the foregoing conventional obstacle detection mechanisms. Examples of unnavigable floor surfaces that may go undetected include a snag on a carpet upon which the robot is caught, a carpet that is too thick for the robot to traverse, a bump, a steep approach angle, or an incline that the robot cannot climb, loose terrain such as mud, loose gravel, uneven rocks, and the like.

SUMMARY OF THE INVENTION

Embodiments of the invention advantageously overcome the disadvantages of the prior art. Embodiments of the invention can be used independently or in combination with other sensors, such as with proximity sensors and/or with contact sensors.

One embodiment of the invention is a method of determining a motional state of a mobile robot, the method including: retrieving pixel data for images taken at intervals from a camera that is coupled to the mobile robot; comparing pixel data for a first image to pixel data for a second image to generate a measure of a difference between the two images, wherein comparing includes: filtering the first image pixel data with a gradient magnitude filter, where the gradient magnitude filter computes at least a spatial gradient; comparing the gradient-magnitude filtered first image pixel data to a first threshold; generating a binary map of the first image pixel data at least partly in response to the comparison of the gradient-magnitude filtered smoothed first image pixel data with the first threshold; filtering the second image pixel data with the gradient magnitude filter; comparing the gradient-magnitude filtered smoothed second image pixel data to a second threshold; generating a binary map of the second image pixel data at least partly in response to the comparison of the gradient-magnitude filtered second image pixel data to the second threshold; and comparing the binary map of the first image pixel data to the binary map of the second image pixel data to identify data for pixels that are different between the first image and the second image; using the comparison of the pixel data to count the number of pixel data identified as changed; comparing the count to a third predetermined threshold; and determining the motional state of the mobile object at least partly in response to the count.

Another embodiment of the invention is a method of determining a motional state of a mobile robot, the method including: receiving pixel data for video images, where the video images are taken from a camera mounted to the mobile robot; processing the pixel data for the video images to identify amounts of spatial gradient within a video image; characterizing pixels of a video image into at least a first group and a second group, wherein the pixels of the first group correspond to a higher spatial gradient than the pixels of the second group; and using the characterization of the pixels to compare a first video image to a second video image to detect the motional state of the mobile robot.

One embodiment of the invention includes a method of controlling a behavior of a mobile robot based on a mismatch between an intended motional state and a perceived motional state in a mobile robot, the method including: receiving an indication of the intended motional state, where the motional state is selected from the group including moving and not moving; using visual data from a camera that is coupled to the mobile robot to perceive the motional state of the mobile robot, where the perceived motional state of the mobile robot is selected from the group including moving and not moving; comparing the intended motional state to the perceived motional state to detect whether a mismatch exists between the intended motional state and the perceived motional state; and changing the behavior of the mobile robot at least partly in response to a detected mismatch.

One embodiment of the invention is a method of controlling the motion of a self-navigating mobile robot, the method comprising: receiving an indication that the mobile robot is intended to be traveling in a forward direction; determining from visual image data collected from a video camera coupled to the mobile robot that the mobile robot has ceased traveling in a forward direction; discontinuing commands to propel the mobile robot in the forward direction; commanding the mobile robot to travel in a reverse direction for at least a predetermined distance; determining that the mobile robot has traveled in the reverse direction for at least about the predetermined distance; discontinuing commands to propel the mobile robot in the reverse direction; instructing the mobile robot to yaw by at least a first predetermined angle; and commanding the mobile robot to resume forward motion.

One embodiment of the invention is a method of detecting that a mobile robot has been kidnapped, the method including: receiving an indication that the mobile robot is not instructed to be moving; receiving data for video images from a camera coupled to the mobile robot; comparing data from different video images to determine whether or not the mobile robot is in motion; and determining that the mobile robot has been kidnapped when the video images indicate that the mobile robot is in motion.

One embodiment of the invention is a circuit for a mobile robot that is configured to determine a motional state of the mobile robot, the circuit including: a means for receiving pixel data for video images, where the video images are taken from a camera mounted to the mobile robot; a means for processing the pixel data for the video images to identify amounts of spatial gradient within a video image; a means for characterizing pixels of a video image into at least a first group and a second group, wherein the pixels of the first group correspond to a higher spatial gradient than the pixels of the second group; and a means for using the characterization of the pixels to compare a first video image to a second video image to detect the motional state of the mobile robot.

One embodiment of the invention is a computer program embodied in a tangible medium for controlling a behavior of a mobile robot based on a mismatch between an intended motional state and a perceived motional state, the computer program comprising: a module with instructions for receiving an indication of the intended motional state, where the motional state is selected from the group including moving and not moving; a module with instructions for using visual data from a camera that is coupled to the mobile robot to perceive the motional state of the mobile robot, where the perceived motional state of the mobile robot is selected from the group including moving and not moving; a module with instructions for comparing the intended motional state to the perceived motional state to detect whether a mismatch exists between the intended motional state and the perceived motional state; and a module with instructions for changing the behavior of the mobile robot at least partly in response to a detected mismatch.

One embodiment of the invention is a circuit for control of a self-navigating mobile robot, the circuit comprising: a circuit configured to receive an indication that the mobile robot is intended to be traveling in a forward direction; a circuit configured to determine from visual image data collected from a video camera coupled to the mobile robot that the mobile robot has ceased traveling in a forward direction; a circuit configured to discontinue commands to propel the mobile robot in the forward direction; a circuit configured to command the mobile robot to travel in a reverse direction for at least a predetermined distance; a circuit configured to determine that the mobile robot has traveled in the reverse direction for at least about the predetermined distance; a circuit configured to discontinue commands to propel the mobile robot in the reverse direction; a circuit configured to instruct the mobile robot to yaw by at least a first predetermined angle; and a circuit configured to command the mobile robot to resume forward motion.

BRIEF DESCRIPTION OF THE DRAWINGS

These and other features of the invention will now be described with reference to the drawings summarized below.

DETAILED DESCRIPTION OF PREFERRED EMBODIMENTS

Although this invention will be described in terms of certain preferred embodiments, other embodiments that are apparent to those of ordinary skill in the art, including embodiments that do not provide all of the benefits and features set forth herein, are also within the scope of this invention.

It will be understood by one of ordinary skill in the art that mobile robots can be embodied in a variety of forms. In these variety of forms, a robot may be referred to by a different name, such as by a function that is performed by the robot. For example, a robot may be referred to as an automated sweeper or as an automated vacuum cleaner. In one embodiment, a mobile robot corresponds to a self-propelled object that can navigate in an autonomous or semi-autonomous manner. Examples of autonomous or semi-autonomous mobile robots include, but are not limited to, mobile robots for use in automated floor cleaners, humanoid robots, robots for experimentation and lab use, robots for delivering supplies, robots for exploring confined or inaccessible spaces, robots for entertainment or play, and the like. Advantageously, embodiments of the invention can automatically sense a robot's motional state in a relatively reliable and cost-efficient manner. Many configurations of robots are configured to include at least one video camera. Embodiments of the invention permit the use of a video camera onboard a robot to determine a motional state for the robot. This can advantageously permit the motional state of a robot to be determined at a fraction of the cost of additional sensors, such as a laser, an infrared, an ultrasonic, or a contact sensor.

Further advantageously, the visual techniques described can determine that stoppage has occurred even in situations such as contact of the top of a mobile robot platform with an overhanging obstacle, contact of the rear of the platform while moving in a reverse direction, or non-contact stops caused by depletion of batteries. These situations are notoriously difficult or impossible to manage with conventional collision detection sensors, such as infrared sensors, bump sensors, and sonar sensors. Further advantageously, one embodiment of a mobile robot using the visual techniques described herein can be completely passive, that is, the visual techniques produce no transmitted signals that could lead to interference between mobile platforms or with other devices, such as computers, televisions, wireless telephones, and the like, whose operation could be altered by active electromagnetic emissions. Of course, the mobile robot can also be configured to communicate with wireless networks. In addition, for added reliability in environments that lack significant visual texture, the visual techniques described herein can be used in combination with passive and active techniques, such as the use of structured lighting to provide additional scene texture to aid in motional state detection.

Figure 1:
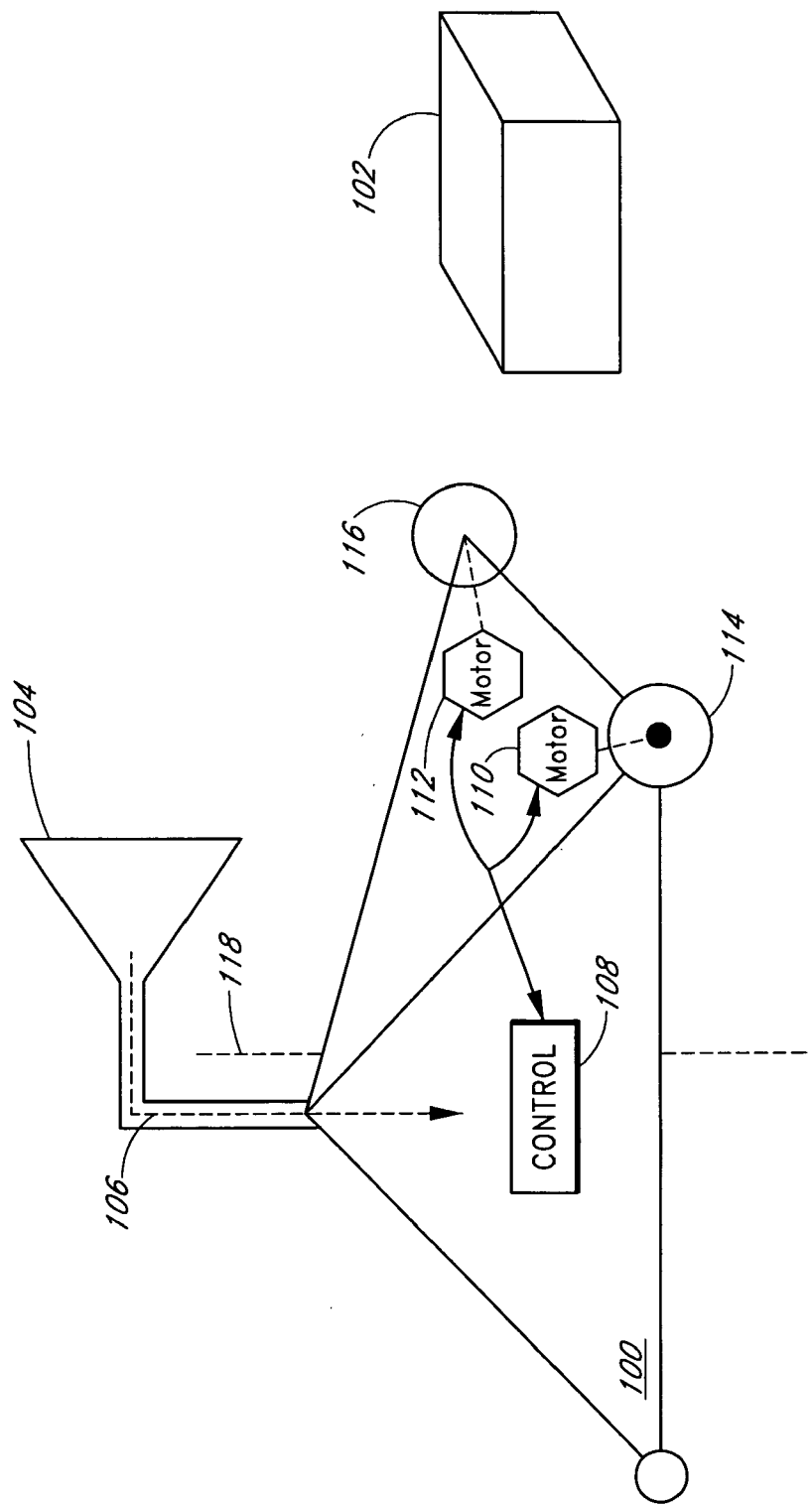
FIG. 1 illustrates an example of an environment in which an embodiment of the invention can be practiced.

FIG. 1 illustrates an example of an environment in which an embodiment of the invention can be practiced. FIG. 1 illustrates an example of a robot 100 and an obstacle 102. The illustrated robot 100 includes a camera 104, which is used to visually observe motion. A broad variety of cameras can be used for the camera 104. For example, the camera 104 can correspond to digital video cameras with CCD imaging, with CMOS imaging, and the like. In addition, it will be understood that the camera 104 can correspond to a single camera or to multiple cameras. Image data 106 from the camera 104 is provided as an input to a control 108 for the robot 100. In the illustrated embodiment, the control 108 is coupled to motors 110, 112 to control the movement of the robot 100. A power source for the robot 100, such as a battery, is not shown in FIG. 1 for clarity. The motors 110, 112 of the illustrated robot 100 are coupled to wheels 114, 116 to provide locomotion for the robot 100. It will be understood by one of ordinary skill in the art that instead of or in addition to wheels, other embodiments of the robot can use legs, tracks, rollers, propellers, and the like, to move around. In the illustrated embodiment, information regarding the rotation of the wheels, also known as odometry, is also provided as an input to the control 108.

In response to the image data 106, the control 108 can provide control signals to the motors 110, 112 to control movement of the robot 100. For example, the control 108 can provide control signals to cause the robot to move forward, to stop, to move backward, to turn, to rotate about a vertical axis, and the like. When the robot rotates around a vertical axis, such as the exemplary vertical axis 118 shown in FIG. 1, this rotation is referred to as "yaw."

The control 108 can include hardware, such as microprocessors, memory, etc., can include firmware, can include software, can include network communication equipment, and the like. In one embodiment, the control 108 uses dedicated hardware, such as single-board computers, application specific integrated circuits (ASICs), field programmable gate arrays (FPGAs), and the like. In one embodiment, the control 108 is implemented by interfacing to a computer, such as to a laptop computer, and by software executing in a general-purpose computer. The software can include instructions that are embodied in a tangible medium, such as a hard disk or optical disk. Data processing for the robot 100 can be performed entirely within the robot 100 or partially outside the robot 100. For example, the control 108 can be configured to relay data to another computer, via a network such as a wireless network, where a portion of the data processing takes place. Examples of the data processing will be described later in connection with FIG. 3.

As the robot 100 navigates around an area, such as a room, the robot 100 can encounter the obstacle 102. The obstacle 102 can prevent the robot 100 from moving along a desired path. Some obstacles 102 can be include physical obstructions, such as a shoe, a piece of furniture, etc, that can also often be detected by conventional sensors, such as contact sensors. In addition, embodiments of the invention can also advantageously detect other causes of stoppage for the robot 100, such as a snag on a carpet upon which the robot can be caught, a carpet that is too thick for the robot to traverse, a bump, a steep approach angle, or an incline that the robot cannot climb, loose terrain such as mud, loose gravel, uneven rocks, and the like. In another example, an embodiment of the invention can advantageously detect stoppage of the robot 100 due to other factors, such as the draining of a battery or the running out of fuel.

Figure 2A:
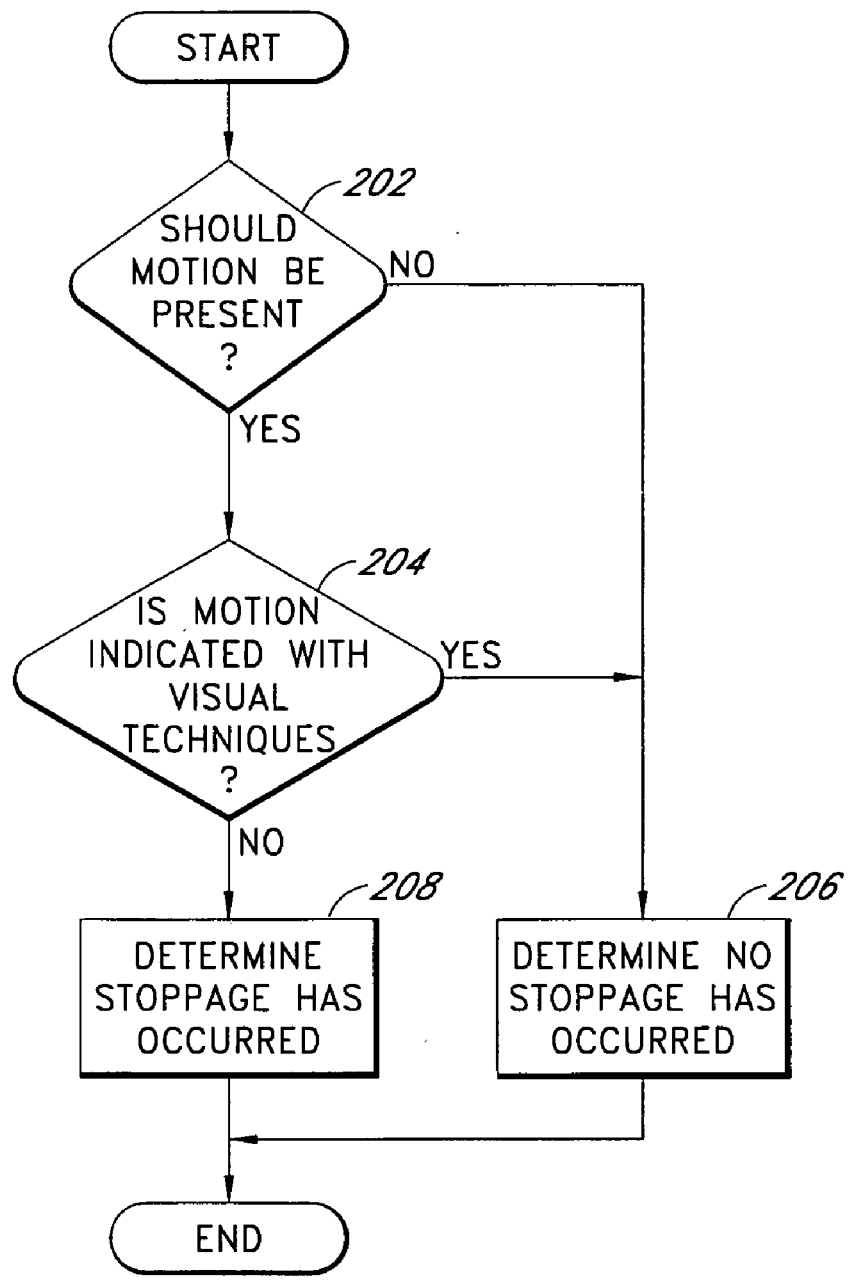
FIG. 2A is a flowchart that generally illustrates a process that uses visual motion sensing to determine that an unintended stoppage of a mobile robot has occurred.
Figure 2B:
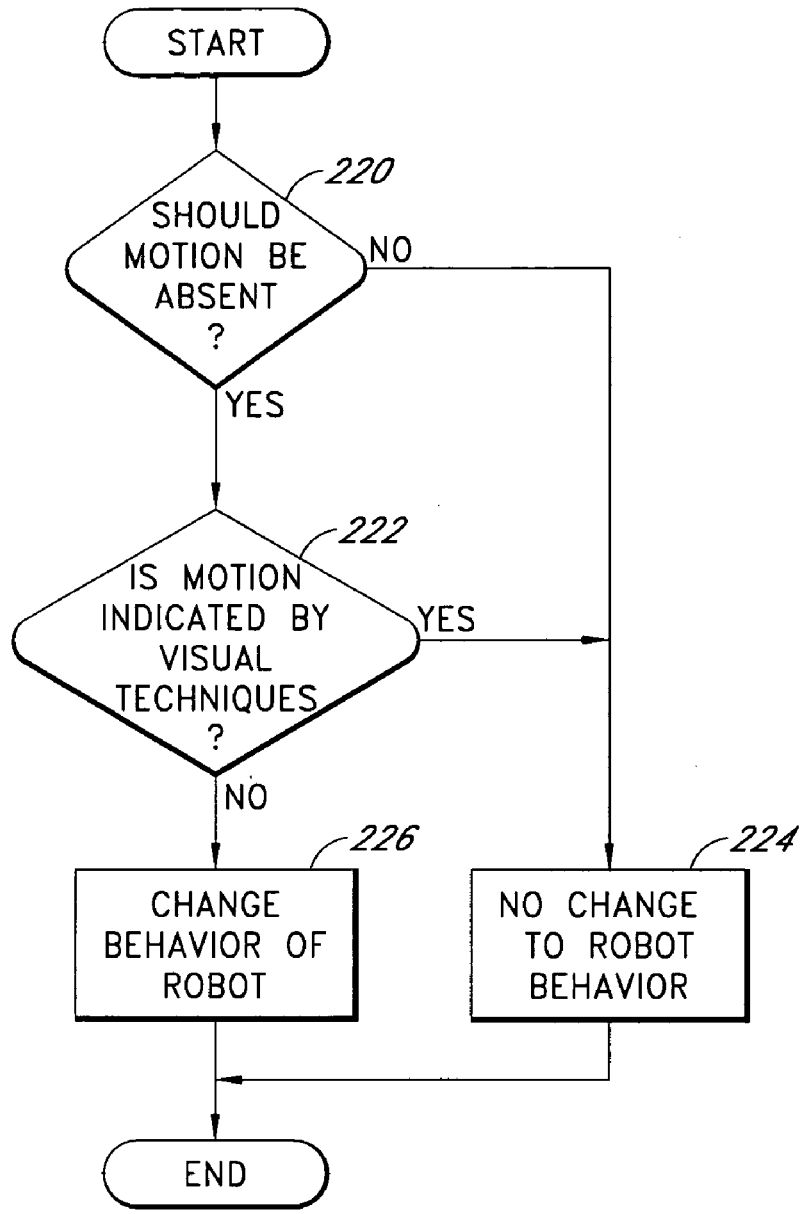
FIG. 2B is a flowchart that generally illustrates a process that uses visual motion sensing to determine that an unplanned movement of a mobile robot has occurred.
Figure 2C:
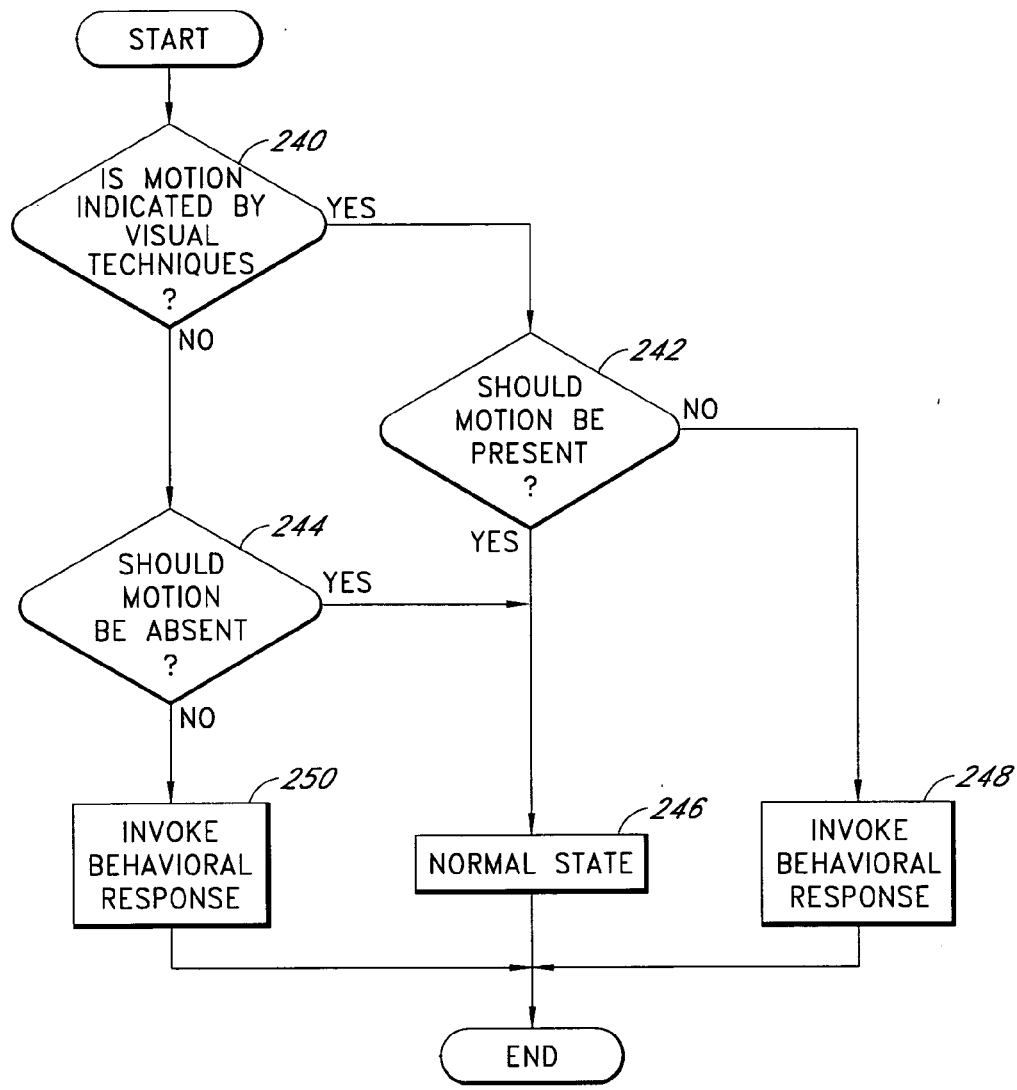
FIG. 2C is a flowchart that generally illustrates a process that uses visual motion sensing to determine both unintended stoppages and unplanned movements of a mobile robot.

FIGS. 2A, 2B, and 2C are flowcharts that generally illustrate using visual motion sensing. These processes can operate as part of or separately from a control for the mobile robot. FIG. 2A illustrates responses to an unintended stoppage. FIG. 2B illustrates responses to unexpected and/or unplanned motion. FIG. 2C illustrates an example of a process that detects both unintended stoppages and unexpected motion.

FIG. 2A is a flowchart that generally illustrates a process that uses visual motion sensing to determine that an unintended stoppage of movement of a mobile robot has occurred. It will be understood that "unintended" is viewed from the perspective of the control for the robot. It will be appreciated by the skilled practitioner that the illustrated process can be modified in a variety of ways without departing from the spirit and scope of the invention. For example, in another embodiment, various portions of the illustrated process can be combined, can be rearranged in an alternate sequence, can be removed, and the like. The process begins at a decision block 202. In the decision block 202, the process determines whether the robot should be moving, that is, is intended to be in motion. In one embodiment, this information is provided by monitoring a status flag in a register that is updated by the control for the robot. The process proceeds from the decision block 202 to a decision block 204 when motion should be present. Otherwise, the process proceeds from the decision block 202 to a state 206.

In the decision block 204, the process determines whether the robot is moving. The process analyzes visual images taken by a camera that is coupled to the robot. Further details of one embodiment of analyzing images for motion using computations of gradient magnitude will be described later in connection with FIG. 3. Other techniques that can be used to detect motion in a visual manner include optical flow techniques, change detection techniques, and simultaneous structure and motion estimation techniques. The process proceeds from the decision block 204 to the state 206 when motion is detected. When motion is not detected, that is, when stoppage is detected, the process proceeds from the decision block 204 to a state 208.

In the state 206, the process determines that no stoppage has occurred. In one embodiment, the state 206 can correspond to a "normal" state or non-error event. Thus, it will be understood that the presence of the state 206 does not necessarily imply that any particular action will be initiated by the robot in the state 206. The process can proceed from the state 206 end, where the process can be repeated.

Returning now to the state 208, the process determines that a stoppage of the robot has occurred. In response to the detection of the stoppage when motion should be present as indicated by the decision block 202, the process can initiate a variety of responses. For example, the process can set an alarm or an alert, such as, to indicate to a user that the robot is stuck. In another example, the process can initiate procedures to free the robot. In one embodiment, the robot proceeds along the opposite direction, which is typically in the reverse direction, rotates about a vertical axis (yaw) by about 90 degrees, and then proceeds to travel in, for example, a forward direction. Other amounts of rotation will be readily determined by one of ordinary skill in the art. In one embodiment, the robot moves in the reverse direction by a distance that permits the robot to rotate about an axis. In one example, the distance is about 0.2 meters, but it will be understood by the skilled practitioner that this distance can vary based upon the footprint and rotating radius of the robot. In another embodiment, where the robot is used as a floor sweeper or vacuum cleaner, the indication of stoppage is used to shut off cleaning brushes or other cleaning mechanisms to prevent an undesirable wear spot on the floor from the repeated application of sweeping in one area. The process can then proceed to end.

The process can be repeated as desired. For example, the process can be repeated at fixed or at varying intervals. In one embodiment, the process is completed in the background.

FIG. 2B is a flowchart that generally illustrates a process that uses visual motion sensing to determine that an unplanned movement of a mobile robot has occurred. One example of an unplanned movement is "kidnapping," where a mobile robot is picked up and moved to a new location. Other examples include bumping by or impact with another object, being blown by strong winds, sliding on a slippery or a sloped surface, and the like such that the mobile robot is physically displaced and/or rotated. The process can advantageously be used to detect such events and to spur a change in the behavior of the robot. For example, when a robot is kidnapped or bumped, an estimate of a pose of the robot, that is, the position and the orientation of the robot, may have changed and the pose that is maintained by mapping processes and/or localization processes may no longer be accurate. One example of a process for robot navigation is known as simultaneous localization and mapping (SLAM). In a robot with SLAM, the robot can advantageously exhibit a relatively high degree of autonomy. A robot with SLAM can autonomously build a "map" of its environment using its sensors, and then use the map for localization, that is, to find out where the robot is. The detection of the unplanned movement can advantageously be used to indicate that the pose may no longer be accurate such that, for example, the mapping processes can temporarily inhibit new entries in a mapping database which would otherwise be based on an inaccurate pose.

The process begins at a decision block 220. In the decision block 220, the process determines whether motion should be absent, that is, whether the robot and the camera, should the camera be movable, are instructed by a control for the robot to be stopped. In one embodiment, this state is determined by retrieving a status indicator, such as by monitoring a status flag, from the control. The process proceeds from the decision block 220 to a decision block 222 when motion should be absent. Otherwise, the process proceeds from the decision block 220 to a state 224.

In the decision block 222, the process uses a visual technique to detect motion. An example of a visual technique that can be used will be described later in connection with FIG. 3. When motion is detected by the visual technique, the process proceeds from the decision block 222 to a state 226. Otherwise, the process proceeds to the state 224.

In the state 224, at this point in the process, an unplanned motion has not been indicated. Accordingly, in one embodiment, there is no change to the robot behavior in the state 224. The process can then proceed to end and can be repeated as desired.

In the state 226, at this point in the process, an unplanned motion has been detected. The detection of the unplanned motion can be used in many ways to change the behavior of the robot. For example, the change in behavior can include the setting of an alert, a procedure to upright a mobile robot that can be knocked over or detect that the mobile robot has been knocked over, a resetting of an estimate of pose, and the like. In one example, the resetting of the estimate of the pose can be effected by altering probabilities associated with various hypothetical poses. In another example, the change in behavior can correspond to a disabling of mapping functions for recognition of new landmarks into a mapping database. For example, this disabling can last for a predetermined time, until the robot has determined a new pose, until the robot has observed a predetermined number of landmarks, or a combination of the foregoing. The process then ends and can be repeated as desired.

FIG. 2C is a flowchart that generally illustrates a process that uses visual motion sensing to determine both unintended stoppages and unplanned movements of a mobile robot. It will be appreciated by the skilled practitioner that the illustrated process can be modified in a variety of ways without departing from the spirit and scope of the invention. For example, in another embodiment, various portions of the illustrated process can be combined, can be rearranged in an alternate sequence, can be removed, and the like.

In a decision block 240, the process determines whether motion is observed by a visual technique, such as the visual technique that will be described later in connection with FIG. 3. When motion is indicated, the process proceeds from the decision block 240 to a decision block 242. When no motion is indicated, the process proceeds from the decision block 240 to a decision block 244.

In the decision block 242, at this point in the process, the process has perceived motion. In the decision block 242, the process determines whether such motion should be present. For example, the indication of whether motion should be present or absent can be ascertained by inspecting a status flag from a control for the robot. When motion should be present, and motion is detected, the process proceeds from the decision block 242 to a state 246.

The state 246 can correspond to a normal state or a non-error state. The state 246 is entered when there is a match between the motional state, as observed by visual techniques, and the motional state desired by a control for the robot. It will be understood that the presence of the state 246 does not indicate that the robot will initiate a particular response in the state 246.

Returning now to the decision block 242, in the case when motion is detected and such motion should not be present, the process proceeds from the decision block to a state 248.

In the state 248, the process invokes a behavioral response in response to the detection of the mismatch in the observed motional state of moving and the desired motional state of not moving. Examples of such responses were described earlier in connection with the state 226 of FIG. 2B.

Returning now to the decision block 244, at this point in the process, motion had not been observed by the visual techniques in the decision block 240. In the decision block 244, the process determines whether motion should be absent. In one embodiment, the desired motional state is retrieved by monitoring a status flag from the control for the robot. The process proceeds from the decision block 244 to the state 246, which can correspond to the normal state, when the observed motional state of not moving and the desired motional state of not moving match. When the observed motional state of not moving and the desired motional state of not moving do not match, the process proceeds from the decision block 244 to a state 250.

In the state 250, the process invokes a behavioral response in response to the detection of the mismatch between observed motional state and desired motional state. Examples of such responses were described earlier in connection with the state 208 of FIG. 2A. The process then proceeds to end and can be repeated as desired.

Figure 3:
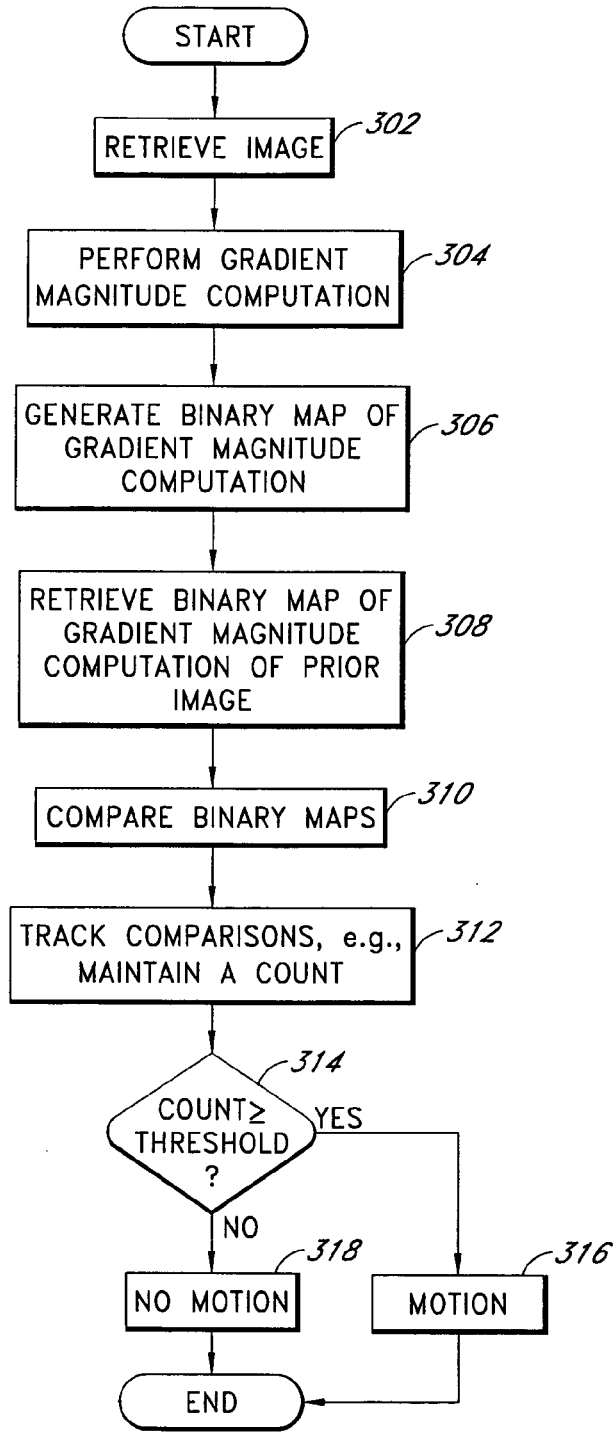
FIG. 3 is a flowchart that generally illustrates a process for determining whether motion has occurred from visual observations.

FIG. 3 is a flowchart that generally illustrates a process for determining whether motion has occurred from visual observations. In many configurations for robots, a camera is a desirable feature. Advantageously, the process can be performed using the visual data from a camera or cameras that is coupled to the robot such that motion detection can be provided with little or none of the additional cost, size, weight, power, maintenance and other drawbacks of additional sensors, such as contact sensors. Further advantageously, the process described herein filters images such that relatively minor motions that are due to vibrations of the robot that occur while the robot is in a stopped, but not entirely motionless state, are not falsely detected as motion. The camera can be coupled to the robot via a variety of techniques, such as attached to the robot, can be coupled to a computer that is mounted in the robot, etc.

While the process of FIG. 3 will generally be described in the context of images received from a grayscale camera, also known as a black and white camera, it will be understood that the principles and advantages described herein apply to a broad variety of cameras, such as to color cameras, to infrared cameras, to night vision cameras, and the like. It will also be understood that the process can be used with cameras of a variety of resolutions and that the process can be combined with techniques such as subsampling such that fewer than all the available pixel data is used. It will also be appreciated by the skilled practitioner that the illustrated process can be modified in a variety of ways without departing from the spirit and scope of the invention. For example, in another embodiment, various portions of the illustrated process can be combined, can be rearranged in an alternate sequence, can be removed, and the like.

The process begins at a state 302. In the state 302, the process retrieves data for an image from the camera. It will be understood that the data from the camera can be transferred to another device, such as to memory in a control for the robot, and then the process can retrieve the data for the image from the memory by addressing the corresponding memory locations via pointers and the like. In one embodiment, the data retrieved in the state 302 corresponds to the data for the most recent image taken by the camera. This facilitates the use of the process in a real-time application. However, it will be understood that the data for a relatively recent image can also suffice. The process advances from the state 302 to a state 304.

In the state 304, the process performs a gradient magnitude computation of the data for the image retrieved in the state 302 to identify regions of the image with relatively high spatial gradient. In one embodiment, prior to or at the same time as the gradient magnitude computation, the data for the image is also filtered with a low pass filter, such as by a Gaussian filter. In the illustrated embodiment of the process, the process advantageously performs the gradient magnitude computation to the two-dimensional data for the image by repeated application of one-dimensional convolution filters. Repeated application of one-dimensional convolution filters is advantageously less computationally intensive than the use of two-dimensional convolution filters. For example, the convolution filter can be applied to data in a first direction, such as to data in rows, and then the filter can be applied to data in a second direction orthogonal to the first direction, such as to data in columns. In one embodiment, after application of the filter in one-dimension, the filtered data is separately maintained, e.g., the data filtered in the x-direction is separately maintained from the data that is a result of filtering in the y-direction. It will be understood by the skilled practitioner that two-dimensional convolution filters can also be used.

Equation 1 illustrates a kernel (impulse response coefficients) for a convolution filter that can be used to perform low pass filtering of the data for the image. Although a Gaussian filter is shown, it will be understood that other low pass filters are applicable. The effect of the low-pass filtering is to "smooth" out the image. In one embodiment, the filtered results of the low-pass filtering in the x-direction are maintained separately from the filtered results of the low-pass filtering in the y-direction.

$$[1\ 4\ 6\ 4\ 1]/16 \quad (Eq.\ 1)$$

Equation 2 illustrates a kernel for a convolution filter that can be used to compute a derivative or differences of data (termed gradient filter).

$$[-1\ 0\ 1]/2 \quad (Eq.\ 2)$$

In one embodiment, the gradient filter, an example of which is described by Equation 2, is applied to the low-pass filtered image data. In the illustrated embodiment, the gradient filter is applied repetitively in one direction to the image data that was low-filtered in the same direction, and then the gradient filter is applied in the other direction to the image data that was low-pass filtered in the other direction. For example, when the gradient filter is applied in the x-direction, the gradient filter is applied to the low-pass filtered data that was filtered in the x-direction.

In one embodiment of the process, the process computes the low pass filtering and the gradient computation at the same time. Equation 3 illustrates a kernel for a convolution filter that combines the impulse responses of the convolution filters expressed in Equation 1 and Equation 2.

$$[-1\ -4\ -5\ 0\ 5\ 4\ 1]/32 \quad (Eq.\ 3).$$

The filter kernel expressed in Equation 3 is also applied to the image data by repeated application one dimension at a time. In one embodiment, the data filtered in one direction by the combined filter is identifiably maintained from the data filtered in the other direction by the combined filter.

The process then proceeds to compute a magnitude of the gradient computation from the data filtered in the two directions to combine the gradient computations that were separately maintained in the two directions. Equation 4 expresses an example of a computation that can be used to calculate the magnitude from the separately maintained gradient computations.

$$M=\sqrt{I_x^2+I_y^2} \quad (Eq.\ 4)$$

Figure 4A:
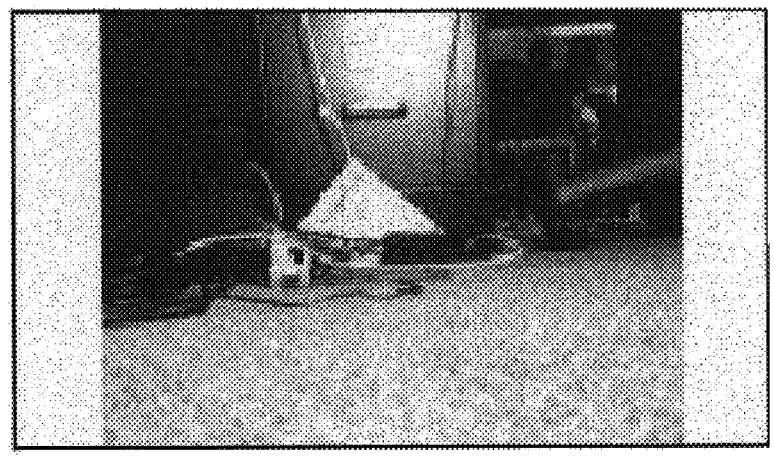
FIG. 4A is a first image taken from a digital video camera attached to a mobile robot.
Figure 4B:
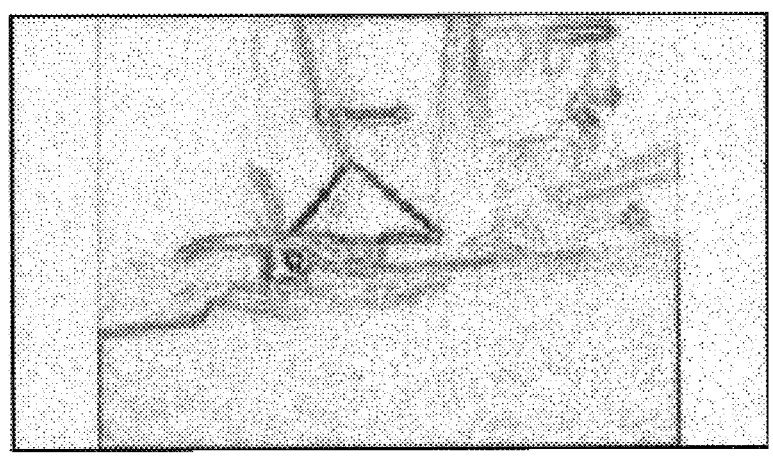
FIG. 4B corresponds to a negative of a graphical representation of a gradient magnitude computation of the first image illustrated in FIG. 4A.
Figure 5A:
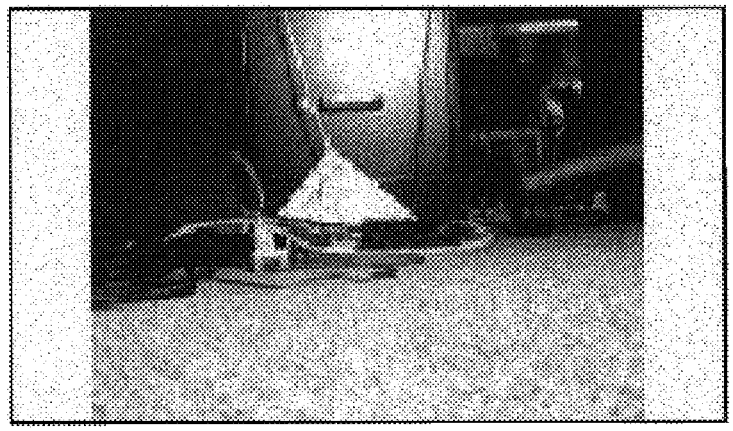
FIG. 5A is a second image taken from a digital video camera attached to a mobile robot.
Figure 5B:
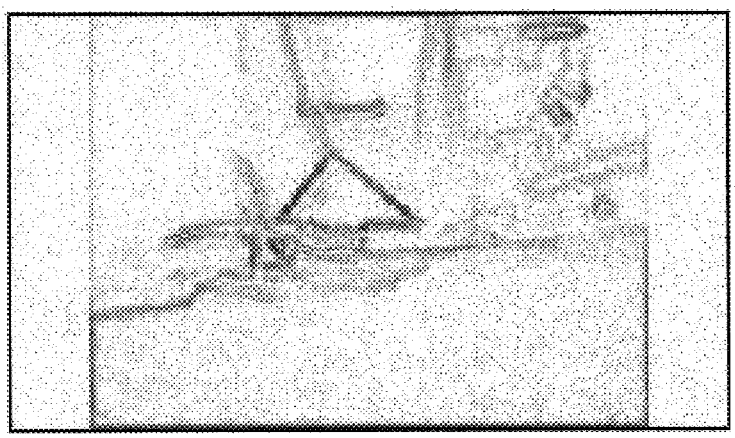
FIG. 5B corresponds to a negative of a graphical representation of a gradient magnitude computation of the second image illustrated in FIG. 5A.
Figure 6A:
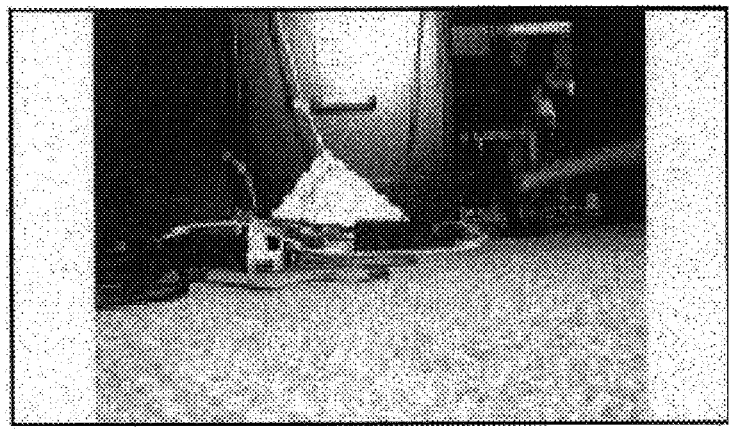
FIG. 6A is a third image taken from a digital video camera attached to a mobile robot.
Figure 6B:
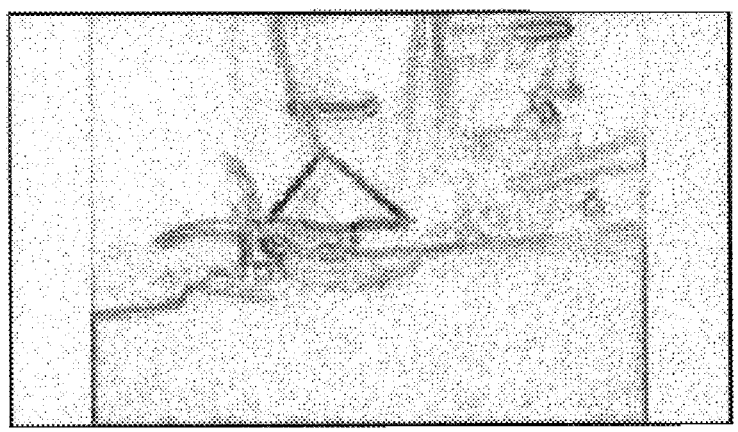
FIG. 6B corresponds to a negative of a graphical representation of a gradient magnitude computation of the third image illustrated in FIG. 6A.

In Equation 4, $I_x$ and $I_y$ are variables that correspond to the data for the gradient of a pixel of data in the x-direction and in the y-direction, respectively. The effect of low-pass filtering, gradient filtering, and magnitude computation, that is, gradient magnitude computation with low pass filtering, can be observed in FIGS. 4B, 5B, and 6B, which correspond to negatives of the gradient magnitude computation with low-pass filtering. For comparison, the data for the original images prior to the gradient magnitude processing, negatives of which are illustrated in FIGS. 4B, 5B, and 6B is illustrated in FIGS. 4A, 5A, and 6A, respectively. In the negatives illustrated in FIGS. 4B, 5B, and 6B, regions of the image with relatively high gradient magnitude are displayed as darker (more black) than regions of the image with relatively low gradient magnitude. It should be noted that the data for the gradient magnitude computation, negatives of which are illustrated in FIGS. 4B, 5B, and 6B is shown to facilitate the understanding of the process described herein and need not be shown or displayed to a user.

Returning now to the process of FIG. 3, after computing the gradient magnitude for the image, the process advances from the state 304 to a state 306.

In the state 306, the process generates a binary map from the gradient magnitude computation. In the illustrated process, the binary map is generated by comparing the values for the gradient magnitude of an image to a threshold G. In one embodiment, the threshold adaptively varies from image to image based on the observed values for gradient magnitude M. For example, one embodiment of the process scans the values for the gradient magnitude M in an image to find the maximum value for M in that image, and then sets the threshold G to be about half the maximum value for M. Other techniques that can be used to determine appropriate values for the threshold G will be readily determined by one of ordinary skill in the art.

Figure 4C:
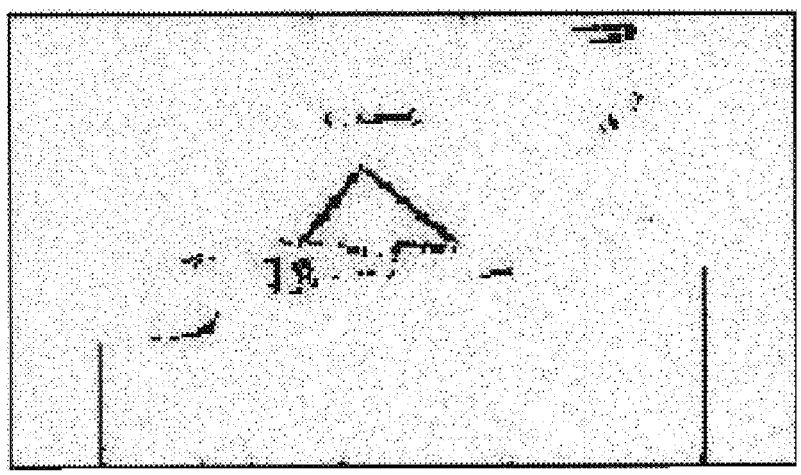
FIG. 4C corresponds to a negative of a graphical representation of a binary map of the gradient magnitude computation after threshold comparison ("binary gradient magnitude").
Figure 5C:
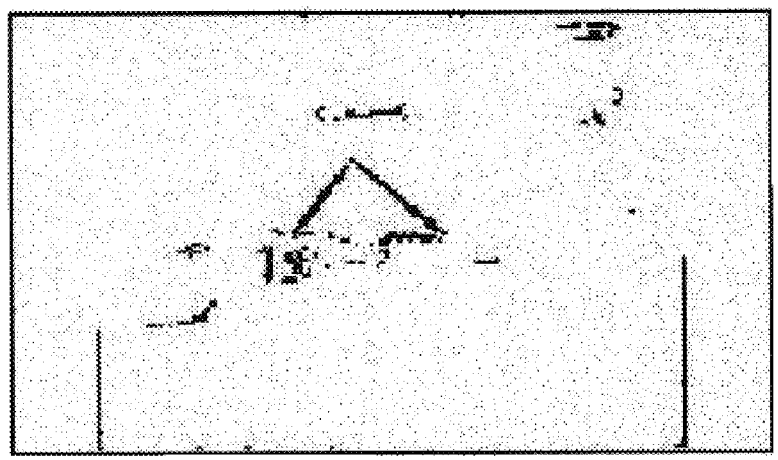
FIG. 5C corresponds to a negative of a graphical representation of a binary map of the gradient magnitude computation after threshold comparison ("binary gradient magnitude").
Figure 6C:
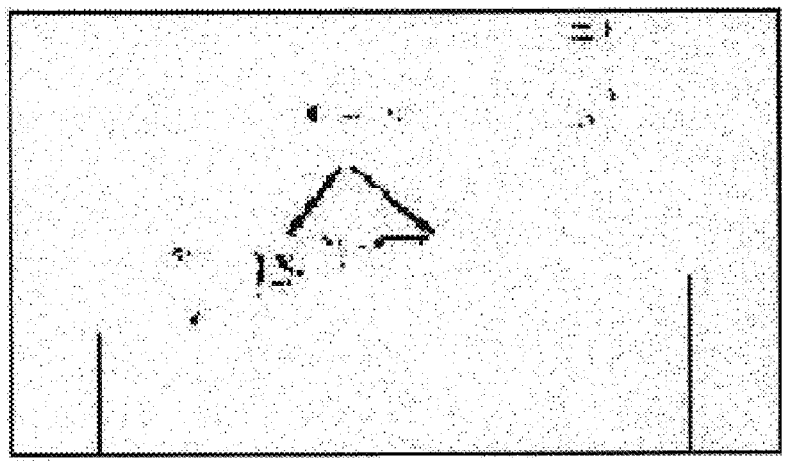
FIG. 6C corresponds to a negative of a graphical representation of a binary map of the gradient magnitude computation after threshold comparison.

Examples of results of the binary mapping of the gradient magnitude are visually presented in FIGS. 4C, 5C, and 6C. FIGS. 4C, 5C, and 6C correspond to negatives of binary mappings of the gradient magnitude computations, negatives of which were illustrated in FIGS. 4B, 5B, and 6B, respectively. In the binary mappings, negatives of which are illustrated in FIGS. 4C, 5C, and 6C, the regions with relatively high gradient magnitude that are above the threshold G are presented as "black" and the regions with relatively low gradient magnitude are presented in "white." The binary mapping can be used after it has been computed, can be stored and used and/or reused at a later time, or both. It should be noted that the binary mappings, negatives of which are illustrated in FIGS. 4C, 5C, and 6C need not be shown or displayed to a user. The process advances from the state 306 to a state 308.

In the state 308, the process retrieves a binary map for an image from a different time, such as from an earlier time. For example, in one embodiment, the process retrieves images at the frame rate of the camera. Of course, it will be understood that the process can also retrieve images at a rate slower than the frame rate by skipping frames. In one example, the frame rate is about 10 Hertz. Storing a binary map after the binary map has been computed permits the binary map to be reused without a recalculation. The process advances from the state 308 to a state 310.

In the state 310, the process compares the binary maps of images taken at different times, termed a first image and a second image. In one embodiment, the process compares the binary maps using a "sloppy Exclusive OR" (sloppy XOR) comparison, which provides movement filtering. The sloppy XOR comparison advantageously permits the process to distinguish between relatively small amounts of motion, such as the motion due to vibrations of the robot platform or camera when the platform is in contact with one or more obstacles, and relatively large amounts of motion due to actual physical displacement or change in orientation, such as rotation. In one embodiment, for each point (x,y) in the binary map of the first image, a comparison is made with a block of pixels of dimensions w×h centered at (x,y) in the second image. In one example of a sloppy XOR comparison, the result d at the location (x,y) is determined according to Table I. The sloppy XOR comparison illustrated in Table I was used to generate the data illustrated in FIGS. 5D and 6D.

TABLE I

| Value of (x, y) in First Image | Values in w × h Neighborhood in Second Image | | |
|---|---|---|---|
| | All 0 | Mixed 0 and 1 | All 1 |
| 0 | d = 0 | d = 0 | d = 1 |
| 1 | d = 1 | d = 0 | d = 0 |

In one embodiment, the sloppy XOR computation used by the process is expressed in Table II. Other variations will be apparent to one of ordinary skill in the art.

TABLE II

| Value of (x, y) in First Image | Values in w × h Neighborhood in Second Image | | |
|---|---|---|---|
| | $\geq S_0$ are 0 | other | $\geq S_1$ are 1 |
| 0 | d = 0 | d = 0 | d = 1 |
| 1 | d = 1 | d = 0 | d = 0 |

For example, in the sloppy XOR of Table II, rather than having "all" the bits set to a particular logic state, fewer than all are permissible. For example, the threshold of $S_0$ can correspond to a value such as 7 or 8 for a w×h neighborhood of 3×3. The value for $S_1$ can be the same as the value of $S_0$ or can be selected to be a different value. It will be understood that the thresholds $S_0$, $S_1$ selected can correspond to a broad range of values and can depend on the size of the w×h neighborhood selected.

Appropriate values for w and h can vary in a very broad range. In particular, appropriate values for w and h can vary according to the resolution of the images used for analysis. It will be understood that due to subsampling techniques, the available camera resolution and the resolution used by the process may differ. In the examples illustrated in FIGS. 4A, 4B, 4C, 5A, 5B, 5C, 5D, 6A, 6B, 6C, and 6D, the camera resolution used is 160×120, and a value of 3 is used for both w and h. Values for w and h should be selected to be small enough to permit the comparison to observe changes or movement in features, that is, regions with relatively high gradient magnitude, from one image to another, such as the subsequent image or the image immediately following. Conversely, values for w and h should be selected to be large enough to permit the process to differentiate between relatively large differences in images due to motion and relatively small differences due to vibration. Appropriate values for w and h can be readily determined by one of ordinary skill in the art.

Figure 5D:
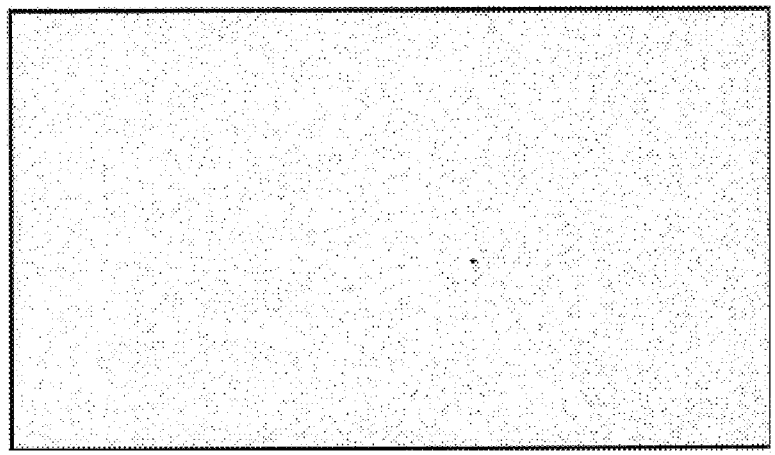
FIG. 5D corresponds to a negative of a graphical representation of the results of a comparison between the binary gradient magnitude of the first image, a negative of which was described in connection with FIG. 4C, and the binary gradient magnitude of the second image, a negative of which was described in connection with FIG. 5C, where FIG. 5D corresponds to relatively little motion.

To illustrate the effects of the sloppy XOR comparison, a negative of a graphical representation of a sloppy XOR comparison between the binary map corresponding to FIG. 4C and the binary map corresponding to FIG. 5C is presented in FIG. 5D. A negative of a graphical representation of a sloppy XOR comparison between the binary map corresponding to FIG. 4C and the binary map corresponding to FIG. 6C is presented in FIG. 6D. The bright pixels in FIGS. 5D and 6D correspond to where the value d of the sloppy XOR is 0, and the dark pixels correspond to where the value d of the sloppy XOR comparison is 1. It will be understood that images generated from the sloppy XOR comparison do not need to be displayed to a user of the robot. The process advances from the state 310 to a state 312.

In the state 312, the process tracks the results of the sloppy XOR comparisons between the two images. In one embodiment, the process counts the number of comparisons that indicates a relatively large difference between images, e.g., the number of comparisons that resulted in a logic "1" by the sloppy XOR logic of Table I. When the robot is relatively stationary, the count will typically be relatively low. When the robot is moving, the count will typically be relatively high. The process advances from the state 312 to a decision block 314.

In the decision block 314, the process compares the count from the state 312 to a threshold T to determine whether to perceive the robot as moving or stationary. The value for the threshold T can vary in a very broad range. In the illustrated example, the value used for the threshold T is 10, and the comparison used is "greater than or equal" ($\geq$). Other appropriate values for the threshold T can be readily determined by one of ordinary skill in the art. It should be noted that the threshold T can vary depending on the resolution used and other environmental variables. In the illustrated process, the process proceeds from the decision block 314 to a state 316 when the count is greater than or equal to the threshold T. Otherwise, the process proceeds from the decision block 314 to a state 318.

In the state 316, the process determines that the motional state of the robot is "in motion." For example, in the illustrated example, the process enters the state 318 when the count of differences from the sloppy XOR comparison is at least 10. The process then ends and can be repeated as desired.

In the state 318, the process determines that the motional state of the robot is "stationary" or not in motion. The process advantageously filters out the relatively small movements associated with vibration of a robot that is stopped by an object or other navigational hazard. The process then ends and can be repeated as desired.

Sample images that have been processed to detect the presence or absence of motion will now be described to illustrate the operation of the process of detecting motion with visual techniques.

FIGS. 4A, 5A, and 6A correspond to 160 by 120 resolution grayscale images taken from a camera that is coupled to a mobile robot. The images of FIGS. 4A and 5A were taken at approximately the same robot pose (same location and orientation). The image of FIG. 6A was taken with the robot rotated (yaw) slightly to the right or clockwise as viewed from above.

FIGS. 4B, 5B, and 6B correspond to negatives of visual images for gradient magnitude computations of the images in FIGS. 4A, 5A, and 6A, respectively. Computation of the gradient magnitude was described in greater detail earlier in connection with the state 304 of FIG. 3. In the negatives illustrated in FIGS. 4B, 5B, and 6B, regions of the images that are relatively dark correspond to areas with relatively high gradient magnitude.

FIGS. 4C, 5C, and 6C correspond to negatives of visual images of the binary maps of the gradient magnitude computations, negatives of which were illustrated in FIGS. 4B, 5B, and 6B, respectively. In the illustrated embodiment, the binary maps are generated from the gradient magnitude computations by comparing the values of the gradient magnitude computations to an adaptively calculated threshold as described in greater detail earlier in connection with the state 306 of FIG. 3. The dark pixels of the negatives illustrated in FIGS. 4C, 5C, and 6C correspond to relatively high gradient magnitude, and the bright pixels correspond to relatively low gradient magnitude.

FIG. 5D corresponds to a negative of a visual representation of a sloppy XOR comparison between the binary map of the image of FIG. 4A (shown in FIG. 4C) with the binary map of the image of FIG. 5A (shown in FIG. 5C). Examples of the sloppy XOR comparison were described earlier in connection with the state 310 of FIG. 3. Where the sloppy XOR comparison indicates a difference, the pixel in the negative is represented as dark. Where the sloppy XOR comparison does not indicate a difference, the pixel in the negative is represented as bright. In the example of FIG. 5D, where the original images of FIGS. 4A and 5A are close, only one pixel in the negative is dark. The dark pixel in the negative can be observed at coordinates (103,70), where coordinate (1,1) is at the upper left corner. Accordingly, the count of the one difference is less than the threshold T, which, for example, can correspond to about 10, and the process accordingly determines that the robot is not in motion.

Figure 6D:
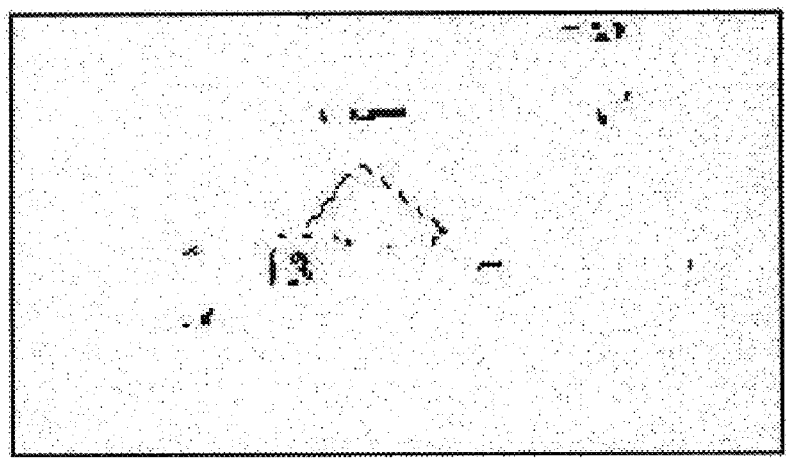
FIG. 6D corresponds to a negative of a graphical representation of the results of a comparison between the binary gradient magnitude of the first image, a negative of which was described in connection with FIG. 4C, and the binary gradient magnitude of the third image, a negative of which was described in connection with FIG. 6C, where FIG. 6D corresponds to relatively high motion.

FIG. 6D corresponds to a negative of a visual representation of a sloppy XOR comparison between the binary map of the image of FIG. 4A (shown in FIG. 4C) with the binary map of the image of FIG. 6A (shown in FIG. 6C). In the same manner described in connection with FIG. 5D, where the sloppy XOR comparison indicates a difference, the pixel in the negative is represented as dark. Where the sloppy XOR comparison does not indicate a difference, the pixel in the negative is represented as bright. In the example of FIG. 6D, where the robot has rotated between the original images of FIGS. 4A and 6A relatively many pixels are indicated as changed (dark). In FIG. 6D, about 171 pixels in the negative are represented as dark. The count of the data points from the sloppy XOR comparison indicating a difference, which are then represented as dark points in the negative in FIG. 6D, is compared to the threshold T. In the illustrated process, the threshold T corresponds to about 10, such that the comparison of the count of 171 pixels is greater than the threshold T of 10. Since the count is relatively high, the process detects that the motional state of the robot is "in motion."

In experiments with a mobile robot, the visual techniques detect stoppages reliably within one second while the robot traveled forward at a rate of about 0.20 meters per second (m/sec). The mobile robot was programmed to undertake an evasive maneuver (for example, backing up 0.2 m and turning ninety degrees) upon detection of a collision, advantageously providing a fully autonomous wandering behavior with only a video camera as a sensor.

Various embodiments of the invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A method of determining a motional state of a mobile robot, the method comprising:
retrieving pixel data for images taken at intervals from a camera that is coupled to the mobile robot;
comparing pixel data for a first image to pixel data for a second image to generate a measure of a difference between the two images, wherein comparing comprises:
filtering the first image pixel data with a gradient magnitude filter, where the gradient magnitude filter computes at least a spatial gradient;
low-pass filtering the gradient magnitude filtered first image pixel data to generate a gradient-magnitude filtered smoothed first image pixel data;
comparing the gradient-magnitude filtered first image pixel data to a first threshold;
generating a binary map of the first image pixel data at least partly in response to the comparison of the gradient-magnitude filtered smoothed first image pixel data with the first threshold;
filtering the second image pixel data with the gradient magnitude filter;
low-pass filtering the gradient magnitude filtered second image pixel data to generate a gradient-magnitude filtered smoothed second image pixel data;
comparing the gradient-magnitude filtered smoothed second image pixel data to a second threshold;
generating a binary map of the second image pixel data at least partly in response to the comparison of the gradient-magnitude filtered second image pixel data to the second threshold; and
comparing the binary map of the first image pixel data to the binary map of the second image pixel data to identify data for pixels that are different between the first image and the second image;
using the comparison of the pixel data to count the number of pixel data identified as changed;
comparing the count to a third predetermined threshold;
determining the motional state of the mobile robot at least partly in response to the count; and
automatically providing an indication to a user that an undesired stoppage of the mobile robot has occurred if:
the motional state of the mobile robot indicates that the mobile robot is not in motion; and
the mobile robot is intended to be in motion.

2. The method as defined in claim 1, wherein the method is performed in real time.

3. The method as defined in claim 1, wherein the gradient magnitude filter further comprises a low-pass filter such that the gradient magnitude filter computes both the spatial gradient and the low-pass-filtering for smoothing.

4. The method as defined in claim 3, wherein the low-pass filter corresponds to a Gaussian filter.

5. The method as defined in claim 3, wherein filtering the first image pixel data further comprises:
filtering the first image pixel data in a first direction and in a second direction with a gradient filter that is characterized by the following convolution kernel, [−1−4−5 0 5 4 1]/32, where results of filtering are separately maintained for the first direction and for the second direction; and
combining the separately maintained data by computing a magnitude of the data.

6. The method as defined in claim 1, further comprising low-pass filtering image pixel data prior to computing a gradient.

7. The method as defined in claim 6, wherein a low-pass filter is characterized by the following convolution kernel: [1 4 6 4 1]/16; and a gradient filter is characterized by the following convolution kernel: [−1 0 1]/2.

8. The method as defined in claim 1, further comprising:
receiving an indication that the mobile robot is intended to be in motion in a first direction;

determining that the motional state of the mobile robot is not in motion while receiving the indication that the mobile robot is intended to be in motion; and changing a path of travel for the mobile robot at least partly in response to the determination.

9. The method as defined in claim 1, further comprising subsampling the pixel data such that fewer than all the available pixels from the camera are used.

10. The method as defined in claim 1, wherein the third predetermined threshold varies at least partly in response to a number of pixels used to compute the count.

11. The method as defined in claim 1, wherein the first threshold and the second threshold are adaptive to filtering by the gradient magnitude filter of the first image pixel data and the second image pixel data, respectively.

12. The method as defined in claim 11, wherein the first threshold is selected to be about half the maximum value for the gradient magnitude computed for a pixel by the gradient magnitude filter after filtering of the first image pixel data, and where the second threshold is selected to be about half the maximum value for the gradient magnitude computed for a pixel by the gradient magnitude filter after filtering of the second image pixel data.

13. The method as defined in claim 1, wherein the comparison of the binary map of the first image pixel data to the binary map of the second image pixel data comprises a sloppy exclusive-or (XOR) computation.

14. The method as defined in claim 13, wherein the sloppy XOR is computed by comparing a pixel from the binary map of the first image pixel data with a location of (x,y) to a plurality of pixels in the binary map of the second image pixel data, wherein the plurality of pixels includes a pixel with a location of (x,y).

15. The method as defined in claim 1, wherein the motional state is determined only with observation of visual data.

16. The method as defined in claim 1, where the mobile robot is autonomous, and where the method is performed entirely within the mobile robot.

17. The method as defined in claim 1, further comprising:
sending pixel data from the mobile robot to a remote computer;
performing at least part of filtering operations in the remote computer; and
receiving an indication of the motional state of the mobile robot from the remote computer.

18. A method of determining a motional state of a mobile robot, the method comprising:
receiving pixel data for video images, where the video images are taken from a camera mounted to the mobile robot;
processing the pixel data for the video images to identify amounts of spatial gradient within a video image;
characterizing pixels of a video image into at least a first group and a second group, wherein the pixels of the first group correspond to a higher spatial gradient than the pixels of the second group;
using the characterization of the pixels to compare a first video image to a second video image to detect the motional state of the mobile robot, wherein the motional state is selected from a set of possible motional states, the set comprising at least "in motion" and "not in motion;" and
automatically providing an indication to a user that an undesired stoppage of the mobile robot has occurred if:
the motional state of the mobile robot indicates that the mobile robot is not in motion; and
the mobile robot is intended to be in motion.

19. The method as defined in claim 18, wherein characterizing further comprises:
arranging the pixels of a video image into a binary map such that a first logic state indicates association with the first group with the higher spatial gradient; and
a second logic state indicates association with the second group.

20. The method as defined in claim 19, wherein using the characterization comprises:
comparing a binary value for one pixel from the binary map of the first image to a group of binary values for a group of pixels in the second image;
wherein the group of pixels in the second image includes a pixel in the same location as the one pixel from the binary map of the first image.

21. The method as defined in claim 20, where comparing the binary value to the group of binary values further comprises computing a sloppy Exclusive-OR ("sloppy XOR") operation between the binary value and the group of binary values.

22. The method as defined in claim 18, further comprising:
inspecting pixel data to evaluate whether enough useful spatial gradients exist for robust detection of the motional state; and
inhibiting a motional state of "not moving" at least partly in response to a determination that the detection of the motional state is not likely to be reliable.

23. The method as defined in claim 18, wherein the motional state is determined only by analysis of visual data observed by the camera.

24. The method as defined in claim 18, where the mobile robot is autonomous, and where the method is performed entirely within the mobile robot.

25. The method as defined in claim 18, further comprising:
sending pixel data from the mobile robot to a remote computer;
performing at least part of pixel characterizing operations in the remote computer; and
receiving an indication of the motional state of the mobile robot from the remote computer.

26. The method as defined in claim 18, wherein processing the pixel data further comprises processing the pixel data to identify amounts of spatial gradient within the entire video image.

27. A method of controlling a behavior of a mobile robot based on a mismatch between an intended motional state and a perceived motional state in a mobile robot, the method comprising:
receiving an indication of the intended motional state, where the motional state is selected from the group including moving and not moving;
using visual data from a camera that is coupled to the mobile robot to perceive the motional state of the mobile robot, where the perceived motional state of the mobile robot is selected from the group including moving and not moving, wherein the mobile robot uses simultaneous localization and mapping (SLAM) techniques for navigation;
comparing the intended motional state to the perceived motional state to detect whether a mismatch exists between the intended motional state and the perceived motional state; and
automatically changing the behavior of the mobile robot at least partly in response to a detected mismatch if:

the intended motional state of the mobile robot indicates that the mobile robot is moving; and the perceived motional state of the mobile robot indicates that the mobile robot is not moving.

28. The method as defined in claim 27, wherein the intended motional state is moving, where changing the behavior comprises changing a navigated path, further comprising:

instructing the mobile robot to travel in a direction approximately opposite to that previously requested for at least a distance sufficient to clear an obstruction;
instructing the mobile robot to yaw; and
instructing the mobile robot to resume traveling.

29. The method as defined in claim 27, wherein the intended motional state is moving, and where changing the behavior comprises shutting off motors to conserve battery life.

30. The method as defined in claim 27, wherein the mobile robot further comprises floor cleaning brushes, wherein changing the behavior further comprises shutting off cleaning brushes.

31. The method as defined in claim 27, wherein the mobile robot further comprises a vacuum cleaner, wherein changing the behavior further comprises shutting off the vacuum cleaner.

32. The method as defined in claim 27, wherein the intended motional state is moving, and where changing the behavior comprises setting an alert.

33. The method as defined in claim 27, wherein changing the behavior comprises:

resetting an estimate of pose (location and heading); and
disabling mapping functions for recognition of new landmarks until localization is achieved.

34. The method as defined in claim 27, wherein changing the behavior comprises disabling mapping functions for recognition of new landmarks until passage of a predetermined amount of time.

35. The method as defined in claim 34, wherein changing the behavior further comprising resetting an estimate of pose, including location and heading.

36. The method as defined in claim 27, wherein changing the behavior comprises disabling mapping functions for recognition of new landmarks until a predetermined number of unmatched landmarks have been observed.

37. The method as defined in claim 36, wherein changing the behavior further comprising resetting an estimate of pose, including location and heading.

38. The method as defined in claim 27, wherein the intended motional state is moving, where changing the behavior comprises:

using the indication to determine that the mobile robot has been knocked over; and
initiating procedures to restore the mobile robot to an upright position.

39. The method as defined in claim 27, wherein the motional state is perceived using only the visual data from the camera.

40. The method as defined in claim 27, where the mobile robot is autonomous, and where the method is performed entirely within the mobile robot.

41. The method as defined in claim 27, further comprising:

transferring visual data from the mobile robot to a remote computer;
performing at least part of filtering operations in the remote computer; and
transferring an indication of the perceived motional state of the mobile robot from the remote computer.

42. A method of detecting that a mobile robot has been kidnapped, the method comprising:

receiving an indication that the mobile robot is not instructed to be moving;
receiving data for video images from a camera coupled to the mobile robot;
comparing data from different video images to determine whether or not the mobile robot is in motion; and
determining that the mobile robot has been kidnapped when the video images indicate that the mobile robot is in motion.

43. A circuit for a mobile robot that is configured to determine a motional state of the mobile robot, the circuit comprising:

a means for receiving pixel data for video images, where the video images are taken from a camera mounted to the mobile robot;
a means for processing the pixel data for the video images to identify amounts of spatial gradient within a video image;
a means for characterizing pixels of a video image into at least a first group and a second group, wherein the pixels of the first group correspond to a higher spatial gradient than the pixels of the second group; and
a means for using the characterization of the pixels to compare a first video image to a second video image to detect the motional state of the mobile robot, wherein the motional state is selected from a set of possible motional states, the set comprising at least "in motion" and "not in motion;"
a means for automatically providing an indication to a user that an undesired stoppage of the mobile robot has occurred if:
the motional state of the mobile robot indicates tat the mobile robot is not in motion, and
the mobile robot is intended to be in motion.

* * * * *